United States Patent
Hatsumi et al.

(10) Patent No.: US 9,853,470 B2
(45) Date of Patent: Dec. 26, 2017

(54) CHARGE AMOUNT DISPLAY APPARATUS OF AN ELECTRIC VEHICLE INCLUDING A CHARGE LIMIT VALUE

(71) Applicant: Mitsubishi Jidosha Kogyo Kabushiki Kaisha, Tokyo (JP)

(72) Inventors: Norihiko Hatsumi, Anjo (JP); Kosuke Moro, Yokohama (JP); Yoshihide Fujikawa, Okazaki (JP); Koichi Tano, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 14/978,744

(22) Filed: Dec. 22, 2015

(65) Prior Publication Data
US 2016/0190842 A1 Jun. 30, 2016

(30) Foreign Application Priority Data
Dec. 25, 2014 (JP) .................................. 2014-263343

(51) Int. Cl.
*G08B 21/00* (2006.01)
*H02J 7/00* (2006.01)
(Continued)

(52) U.S. Cl.
CPC .............. *H02J 7/0047* (2013.01); *B60C 9/00* (2013.01); *B60L 3/0046* (2013.01); *B60L 11/1861* (2013.01); *B60L 2250/16* (2013.01); *H02J 2007/005* (2013.01); *Y02T 10/705* (2013.01); *Y02T 10/7005* (2013.01); *Y02T 10/7044* (2013.01)

(58) Field of Classification Search
CPC ...................................................... H02J 7/0047
USPC ............... 340/438, 455, 636.1, 636.2, 691.6; 320/137
See application file for complete search history.

(56) References Cited

U.S. PATENT DOCUMENTS

| | | |
|---|---|---|
| 2009/0027056 A1 | 1/2009 | Huang et al. |
| 2013/0221928 A1 | 8/2013 | Kelty et al. |
| 2013/0320989 A1 | 12/2013 | Inoue et al. |

FOREIGN PATENT DOCUMENTS

| | | |
|---|---|---|
| JP | 2008-54442 A | 3/2008 |
| JP | 2013-32132 A | 2/2013 |

*Primary Examiner* — Jeffery Hofsass
(74) *Attorney, Agent, or Firm* — Birch, Stewart, Kolasch & Birch, LLP

(57) ABSTRACT

A charge amount display apparatus of an electric vehicle, which enables a driver to be easily aware that a charge amount has been set at a value less than a full charge, is provided. The charge amount display apparatus comprises a control unit 11 for setting a charge limit value which serves as the upper limit of the charge amount of a battery 2; and a display unit 13 for displaying a maximum charge amount, to which the battery 2 can be charged, and the charge limit value. The maximum charge amount is displayed by a segment group 30 composed of a plurality of segments 31 arranged side by side in one direction for representing the charge amount of the battery 2. The segments 31a for a value equal to or lower than the charge limit value, and the segments 31b for a value higher than the charge limit value are displayed in different colors. The segments for a charge amount equal to or lower than the charge limit value are displayed in a first region 21a of a first display region 21 of the display unit 13. A mark 32 indicating that the charge limit value has been set is displayed between the first region 21a and a second region 21b.

8 Claims, 5 Drawing Sheets

(51) Int. Cl.
*B60L 3/00* (2006.01)
*B60L 11/18* (2006.01)
*B60C 9/00* (2006.01)

CHARGE AMOUNT DISPLAY APPARATUS OF AN ELECTRIC VEHICLE INCLUDING A CHARGE LIMIT VALUE

The entire disclosure of Japanese Patent Application No. 2014-263343 filed on Dec. 25, 2014 is expressly incorporated by reference herein.

TECHNICAL FIELD

This invention relates to a charge amount display apparatus of an electric vehicle, the apparatus making it easy for a driver to recognize the set charge amount of a battery in an electric vehicle in which the charge amount of the battery can be set arbitrarily as a countermeasure against regenerative braking insufficiency during a full charge.

BACKGROUND ART

In recent years, electric vehicles equipped with a motor to be driven by a rechargeable battery have come into widespread use. Among such electric vehicles is one which recharges the battery using electric power generated by a regenerative brake for efficient use of energy accumulated in the battery.

During travel on a downward slope immediately after full charging of the battery, for example, charging by regenerative braking results in a full charge without delay, so that the regenerative brake is acting up. A proposal has been made for an electric vehicle in which the charge amount can be arbitrarily set to allow the battery to be charged only to a limit value less than a full charge so that the regenerative brake works more effectively (see, for example, Patent Document 1).

If a person other than a driver sets the limit value, however, the driver may fail to be aware that the limit value has been set. Moreover, if the driver sets the limit value a while ago, for example, there is a possibility that the driver forgets setting the limit value. That is, with the conventional electric vehicles, measures by which the limit value of the charge amount can be easily grasped have not been taken.

PRIOR ART DOCUMENTS

Patent Documents

Patent Document 1: JP-A-2008-54442

SUMMARY OF THE INVENTION

Problems to be Solved by the Invention

The present invention has been accomplished in the light of the above circumstances. It is an object of the invention to provide a charge amount display apparatus of an electric vehicle, which enables a driver to be easily aware that a charge amount has been set at a value less than a full charge.

Means for Solving the Problems

A charge amount display apparatus according to at least one embodiment of the present invention is a charge amount display apparatus of an electric vehicle, comprising: an input unit capable of inputting a charge limit value as an upper limit of a charge amount of a battery which can be charged and can supply electric power to a motor serving as a power source for the electric vehicle; and a display unit for displaying a maximum charge amount, to which the battery can be charged, by a segment group composed of a plurality of segments arranged side by side, the segments each representing the charge amount of the battery, wherein the input unit is configured to be capable of inputting the charge limit value based at least in part on the number of the segments.

Effects of the Invention

According to the present invention, there is provided a charge amount display apparatus of an electric vehicle which enables the driver to be easily aware that the charge amount has been set at a value less than a full charge.

MODE FOR CARRYING OUT THE INVENTION

Embodiments of the present invention will now be described. It is to be noted that the descriptions of the embodiments are illustrative, and the present invention is in no way limited to the following descriptions.

Embodiment 1

Figure 1:
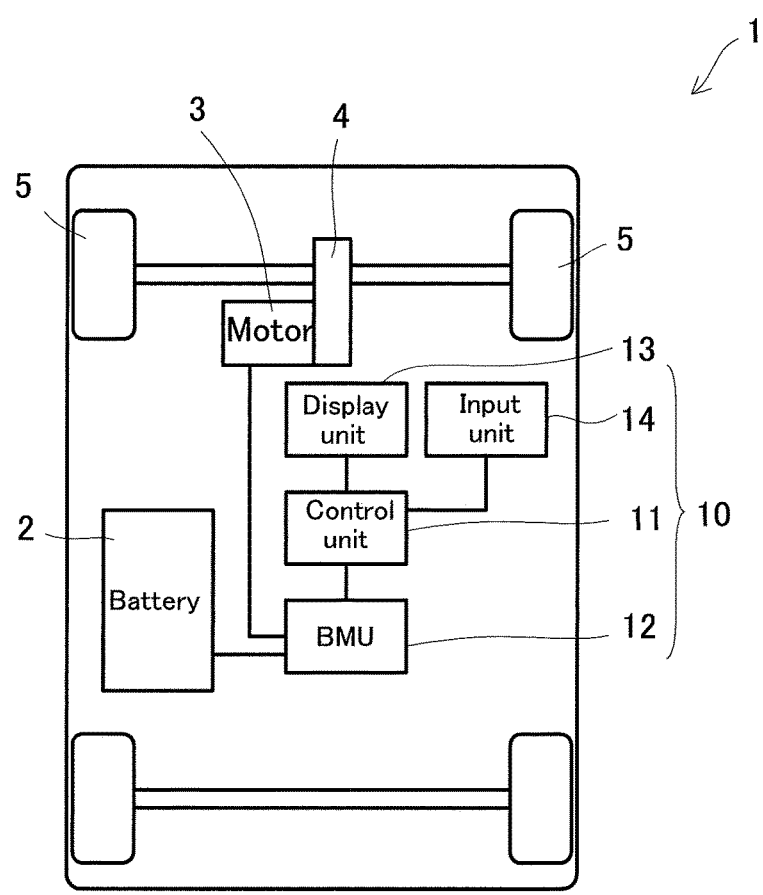
FIG. 1 is a schematic view showing the configuration of a charge amount display apparatus of an electric vehicle.

FIG. 1 is a schematic view showing the configuration of a charge amount display apparatus of an electric vehicle according to the present embodiment. An electric vehicle 1 is equipped with a battery 2, which is a secondary or rechargeable battery, and a motor 3 actuated by the supply of electric power from the battery 2. The battery 2 can be charged by an external power supply (not shown). The motor 3 is coupled to driving wheels (in the present embodiment, front wheels) 5 via a drive mechanism 4. The motor 3 drives the driving wheels 5 via the drive mechanism 4 and, during a so-called regenerative operation, generates electricity upon rotations of the driving wheels 5, and supplies the resulting electric power to the battery 2. A control unit 11 to be described later controls, as appropriate, power supply from the battery to the motor A charge amount display apparatus 10 loaded on the electric vehicle 1 is equipped with the control unit 11, a BMU 12 as an example of a charge control means for the battery 2, a display unit 13 as an example of a display means, and an input unit 14 as an example of an input means.

The control unit 11 is constructed as an LSI device or a built-in electronic device having, for example, a microprocessor, ROM, RAM, etc. integrated thereinto, and is connected to a communication line of an on-vehicle network provided in the vehicle. On the on-vehicle network, various publicly known electronic control devices, such as a brake control device, a transmission control device, a vehicle stability control device, an air conditioning control device, and an electrical equipment control device, are connected to be capable of mutual communication.

To the control unit 11, the input unit 14 is connected for inputting information thereto. As the input unit 14, a touch panel or a switch provided in the electric vehicle 1, for example, can be used. The input unit 14 is not limited to one directly provided in the electric vehicle 1. An information communication terminal in general use, such as a smartphone, which is connected to the control unit 11 via a communication means, may be used as the input unit 14. If such an information communication terminal is used as the input unit 14, the control unit 11 is to be configured to have a communication means capable of communication with the information communication terminal and receive information transmitted from the information communication terminal.

The control unit 11 has the function of setting a charge limit value which is the upper limit of the charge amount of the battery 2. Concretely, the control unit 11 allows the display unit 13 to display a screen for setting the charge limit value of the battery 2, acquires the charge limit value inputted by the operation of the input unit 14 by a driver, and controls the BMU 12 so that the battery 2 is charged, with the charge limit value as the upper limit.

The screen setting for the charge limit value, the acquisition of the charge limit value, and the control of the BMU 12, by the control unit 11, may be executed by an electronic circuit (hardware) or by software.

The BMU 12 controls the battery 2. This control includes, for example, the adjustment of electrical energy to be supplied from the battery 2 to the motor 3, or the adjustment of a charge from an external power supply to the battery 2. Moreover, various pieces of information on the battery 2 are transmitted to the BMU 12. An example of such information is the charge amount of the battery 2. The various pieces of information on the battery 2 obtained by the BMU 12 are transmitted to the control unit 11.

The BMU 12 is configured to control charging of the battery 2 so that the charge amount of the battery 2 does not exceed the charge limit value, when the charge limit value is inputted by the input unit 14 (in the present embodiment, if the charge limit value is set by the control unit 11).

Thanks to such charging control over the battery 2 by the BMU 12, it becomes possible to make the battery 2 only charged up to the charge limit value lower than a full charge. By so doing, even in the case of a downhill travel immediately after charging by an external power supply, the event that the regenerative brake does not work properly can be avoided.

The display unit 13 is a device, such as a display, for indicating different types of information based on the control by the control unit 11. The display unit 13 is not limited, as long as it can display the setting screen for the charge limit value to be described later, as well as the charge amount, the maximum charge amount and the charge limit value of the battery 2. The display unit 13 may have an inputting function, like a touch panel. In this case, a single touch panel corresponds to the display unit 13 and the input unit 14. Also, an information communication terminal connected via a communication means may be employed as a display unit 13. That is, information such as the charge limit value may be transmitted to the information communication terminal by the communication means, and displayed on a touch panel or the like of the information communication terminal.

Figure 2:
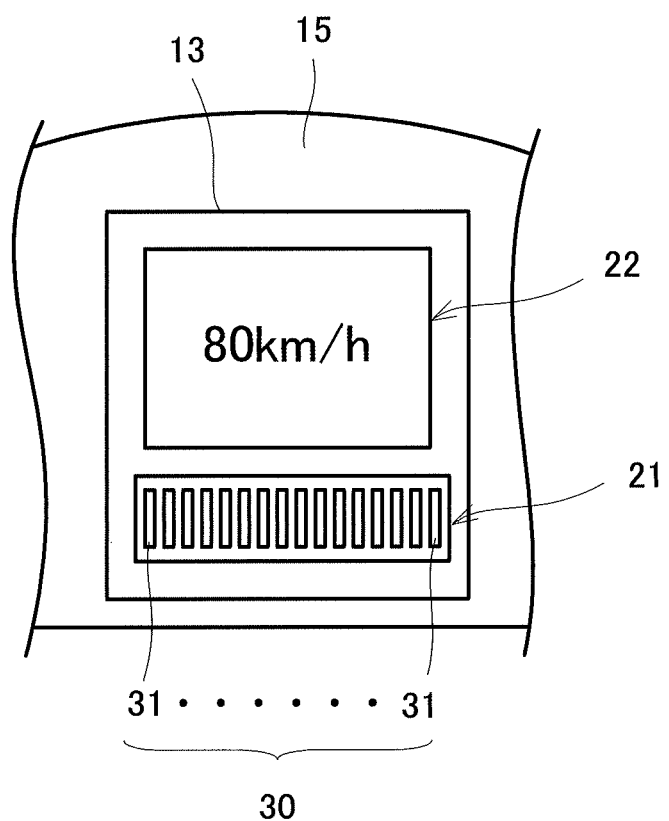
FIG. 2 is a view showing an example of a display unit.

FIG. 2 is a view showing an example of the display unit. The display unit 13 is provided, for example, in a part of an instrument panel 15, and located at a position where it is visually recognized by the driver with ease. The display unit 13 has a first display region 21 and a second display region 22, each of which can display different information.

The first display region 21 is a region where the states of the battery 2, such as the charge amount, the maximum charge amount, and the charge limit value of the battery 2, can be displayed.

The second display region 22 is a region where various types of information, such as the vehicle speed of the electric vehicle 1, and the setting screen for the charge limit value to be described later, can be switched among them, and displayed, based on the operation of the input unit 14 by the driver. The drawing illustrates the vehicle speed of the electric vehicle 1. Needless to say, the second display region 22 is not limited to such an embodiment in which various types of information are switched and displayed.

In the present embodiment, the control unit 11 allows the first display region 21 of the display unit 13 to display a segment 31 representing the charge amount of the battery 2 obtained from the BMU 12. The display unit 13 displays a maximum charge amount, up to which the battery 2 can be charged, by a segment group 30 composed of a plurality of the segments 31 arranged side by side, each segment 31 representing the charge amount of the battery 2. Although the arrangement of the segments 31 is not limited, the segment group 30 in the present embodiment consists of the plurality of segments 31 arranged side by side linearly in one direction.

The drawing illustrates the segment group 30 composed of 16 of the segments 31. Here, the charge amount represented by each segment 31 is a quotient obtained by equally dividing the maximum charge amount of the battery 2. In other words, each segment 31 represents $1/16$ of the maximum charge amount. The segment group 30 consisting of 16 of the segments 31 represents the maximum charge amount.

The control unit 11 determines the number of the segments 31 to be displayed, in accordance with the charge amount of the battery 2 obtained from the BMU 12, and allows the display unit 13 to display this number of the segments 31. The leftmost segment 31 represents a charge amount of 0 to $1/16$ of the maximum charge amount, while the rightmost segment 31 represents a charge amount of $15/16$ of the maximum charge amount to the maximum charge amount. A pattern of the four segments arranged consecutively on the left-hand side in the drawing, for example, means that the charge amount of the battery 2 is of the order of $1/4$ of the maximum charge amount. A pattern of all the sixteen segments 31 displayed means that the charge amount of the battery reaches the maximum charge amount.

If the charge limit value is not set, the control unit 11 determines the number of the segments 31 in accordance with the charge amount of the battery 2, and allows the display unit 13 (first display region 21) to display this number of the segments 31, as mentioned above. This makes it possible for the driver to visually recognize the charge amount easily.

If the battery 2 is set to be charged only up to a charge limit value less than a full charge in order to prevent the regenerative brake from working poorly during the full charge, on the other hand, the control unit 11 allows the display unit 13 to display the maximum charge amount and the charge limit value. The setting of the charge limit value and displays of the maximum charge amount and the charge limit value will be described in detail below.

Figure 3A:
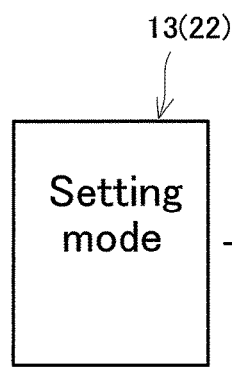
FIGS. 3A to 3C are views showing an example of the display unit in setting a charge limit value.
Figure 3B:
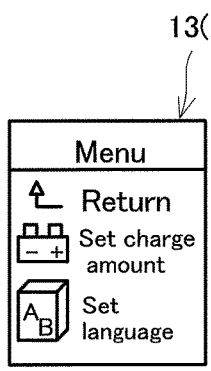
Figure 3C:
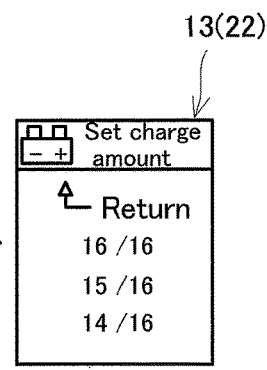

FIGS. 3A to 3C are views showing an example of the display unit in setting the charge limit value. As shown in FIG. 3A, when a predetermined operation has been performed in the input unit 14, the control unit 11 displays a setting mode in the second display region 22 of the display unit 13. Assume, for example, that the input unit 14 is a switch (hereinafter, an explanation will be offered, with the switch being taken as an example of the input unit 14). When detecting that the switch has been pressed long for a certain time as a predetermined operation, the control unit 11 displays "a setting mode" in the display unit 13.

Then, as shown in FIG. 3B, when the predetermined operation has been performed in the input unit 14, the control unit 11 displays a list of items which can be set (menu) in the second display region 22 of the display unit 13. For example, when detecting that the switch has been pressed once as a predetermined operation, the control unit 11 displays the menu in the display unit 13. Here, the menu is a list of selectable items for setting arranged vertically in one direction. By operating the switch, a cursor is moved vertically, whereby the item indicated by the cursor can be selected.

The drawings illustrate "Return" for returning to the last state (the state in FIG. 3A), "Set charge amount" for transition to a screen for setting the charge limit value, and "Set language" for setting a display language for the setting mode. Any of these items can be selected by operating the switch.

As shown in FIG. 3C, when "Set charge amount" is selected in FIG. 3B, the control unit 11 displays a setting screen for setting the charge amount. On the setting screen for charge amount setting, the charge limit value of the batter 2 is selected based at least in part on the number of the segments 31, whereby the charge limit value can be set.

In the present embodiment, the selectable charge limit values are arranged vertically in a display format "X/N", and selection can be made using a cursor moved vertically by operating the switch of the input unit 14. N refers to the total number of the segments 31 and, in the present embodiment, means 16. X denotes the number of the segments 31 to be set as the charge limit value. When "$14/16$" is selected, for example, the control unit 11 takes $14/16$ of the maximum charge amount as the charge limit value, and sets this charge limit value in the BMU 12. When the driver sets the charge limit value in this manner, the BMU 12 charges the battery 2 to that charge limit value.

When the charge limit value is set based at least in part on the number of the segments 31 inputted by the input unit 14 in the above manner, the control unit 11 allows the display unit 13 to display the maximum charge amount and the charge limit value. The display unit 13 displays the segment group 30 so that the number of the segments 31 inputted as the charge limit value by the input unit 14 can be recognized. Display examples of the segment group 30 will be described later.

As explained using FIGS. 3A to 3C, the input unit 14 receives an input of the charge limit value upon selection, by the user, of the value corresponding to the number of the segments 31. Simply by selecting one of the plurality of charge limit values, the charge limit value desired by the user can be set.

Furthermore, the input unit 14 may be configured to have the charge limit value entered therein upon inputting, by the user, of a value corresponding to the number of the segments 31, although this is not illustrated. That is, in connection with the aforementioned example, the input unit 14 may be configured such that the user can directly enter the value "14" therein, without selecting "$14/16$". In this configuration, the charge limit value desired by the user can be set directly and promptly. The embodiment of direct entry of the value is not limited, but in the input unit equipped with a mechanical button, the operation of the button may result in the entry of the value. Alternatively, the input unit may be configured such that when a number displayed on the display unit is touched, a value corresponding to this number serves as an input value.

Figure 4A:
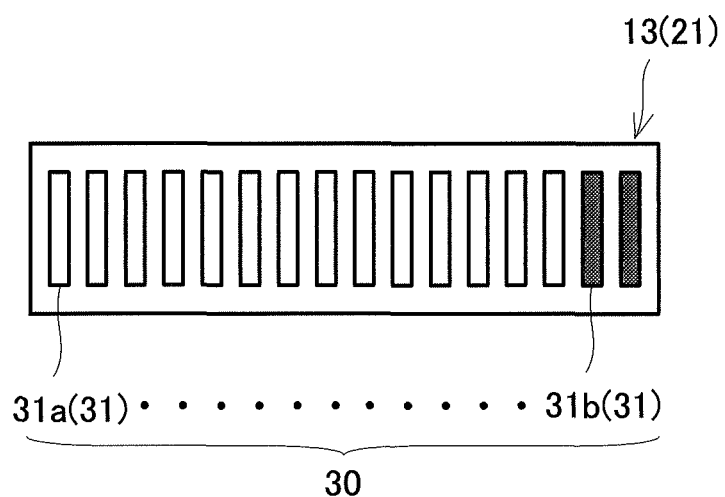
FIGS. 4A, 4B are views showing the maximum charge amount and charge limit value of a battery.
Figure 4B:
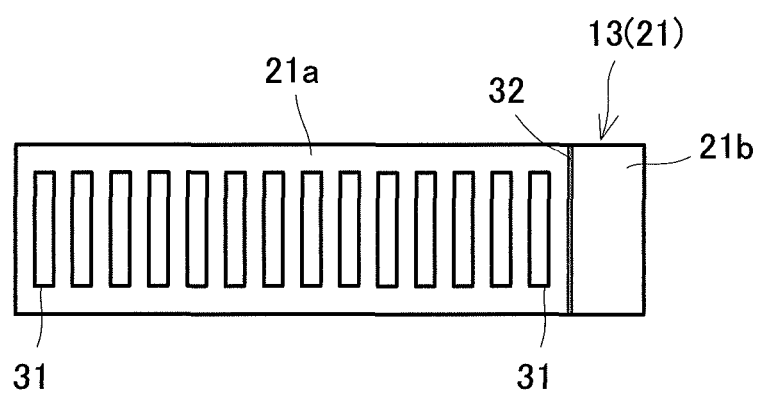

FIGS. 4A and 4B are views showing the maximum charge amount and charge limit value of the battery displayed on the display unit 13. As shown in FIG. 4A, of the plurality of segments 31, the white one is designated as a segment 31a, while the black one is designated as a segment 31b.

In the state in which the battery 2 has been charged to the charge limit value by the BMU 12, the control unit 11 allows the display unit 13 to display the number of the segments 31a corresponding to a charge amount less than the charge limit value. The control unit 11 also allows the display unit 13 to display the number of the segments 31b corresponding to a charge amount greater than the charge limit value.

If the charge limit value is $14/16$ of the maximum charge amount, for example, 14 of the segments 31a correspond to a charge amount equal to or less than the charge limit value. Two of the segments 31b correspond to a charge amount greater than the charge limit value.

Further, the control unit 11 allows the display unit 13 to display the first to fourteenth segments 31a from the left and the fifteenth to sixteenth segments 31b from the left in different colors. For the segment 31a and the segment 31b, concrete colors are not limited, and it suffices that they are displayed in different colors.

As noted above, the display unit 13 displays 1 to 16 of the segments 31 (segment group 30), whereby the maximum charge amount is presented to the driver. Furthermore, the display unit 13 displays the segments 31a and the segments 31b in different colors, whereby it can be easily recognized visually that charging has been performed, with a charge amount corresponding to 14 of the segments 31 among 16 of the segments 31 corresponding to the maximum charge amount being set as the upper limit. As noted here, the display unit 13 displays the number of the segments 31 inputted by the input unit 14 as the charge limit value so as to be recognizable. Thus, the driver can easily recognize visually that the charge limit value has been set.

When the charge amount of the battery 2 has been consumed by driving or the like, the display unit 13 decreases the number of the segments 31a in accordance with the remaining charge amount, and displays the decreased number of the segments 31a. At this time, the display unit 13 may have the segments 31b remain displayed. By so doing, even during driving, it can be recognized that the charge limit value has been set.

FIG. 4B shows an example of the display unit illustrating an embodiment different from that in FIG. 4A. The display unit 13 may display the segments 31, which correspond to a charge amount equal to or less than the charge limit value, in a first region 21a of the first region 21a and a second region 21b constituting the first display region 21, and may display a mark 32 between the first region 21a and the second region 21b. The second region 21b is provided as a region which can display the segments 31 corresponding to a charge amount greater than the charge limit value.

Concretely, the display unit 13 displays the first display region 21 as a frame line. The first display region 21 is of a size enough to accommodate all the segments 31, if the charge limit value is not set. Such a first display region 21 is divided into the first region 21a and the second region 21b by the mark 32.

The mark 32 means that the charge limit value has been set. The mark 32 in the present embodiment is in a linear form extending vertically. The mark 32 is not limited in its concrete shape, as long as it is of a shape which enables the first display region 21 to be divided into the first region 21a and the second region 21b.

The first region 21a is of such a size as to accommodate 14 of the segments 31 corresponding to a charge amount equal to or less than the charge limit value. The second region 21b, on the other hand, is of such a size as to accommodate 2 of the segments 31 corresponding to a charge amount greater than the charge limit value. The segments 31 are displayed in the first region 21a, whereas the segments 31 are not displayed in the second region 21b.

The whole of the first display region 21 makes the driver aware of the maximum charge amount. Since none of the segments 31 are displayed in the second region 21b of the first display region 21, the driver is led into recognizing that a charge amount corresponding to 14 of the segments 31 in the first region 21a is equal to or lower than the maximum charge amount. In this manner, the display unit 13 displays the number (14) of the segments 31, which have been inputted by the input unit 14 as the charge limit value, in the entire first region 21a demarcated by the mark 32. By this means, the driver is led to recognize that the charge amount of the battery 2 reaches the charge limit value. The blank second region 21b can make the driver recognize a capacity which can be charged from the charge limit value up to the maximum charge amount.

Alternatively, the second region 21b may be allowed to display the segments 31. Even in this case, the fourteen segments 31 at the left of the mark 32 can make the driver recognize that the charge amount of the battery 2 reaches the charge limit value. The two segments (not shown) at the right of the mark 32 can make the driver recognize a capacity chargeable from the charge limit value up to the maximum charge amount.

Such displays in the display unit 13 also enable the driver to visually recognize, with ease, that the charge limit value has been set.

As described above, the charge amount display apparatus 10 in the present embodiment displays the maximum charge amount of the battery 2 on the display unit 13 by the segment group 30. Because of this feature, the driver can easily recognize the maximum charge amount by the segment group 30. Furthermore, the charge amount display apparatus 10 can set the charge limit value by adjusting the number of the segments 31. Thus, the driver can render the charge to the battery 2 a value equal to or lower than the charge limit value, simply by setting the number of the segments 31 while confirming the number of the segments 31 displayed on the display unit 13.

Besides, the charge amount display apparatus 10 displays the segment group 30 so that a person can recognize the number of the segments 31 inputted by the input unit 14 (see FIGS. 4A and 4B). Since this feature makes it possible to recognize the charge limit value, set by the driver, from the display of the segment group 30, how much charge limit value has been set can be easily grasped.

As shown in FIG. 4A, as a mode of displaying the segment group so that the number of the segments 31 can be recognized, the charge amount display apparatus 10 makes displays on the display unit 13, with the segments 31a for a value equal to or lower than the charge limit value and the segments 31b for a value greater than the charge limit value being displayed in different colors. This makes it possible to recognize that the charge limit value has been set, and to easily recognize how much charge limit value has been set, in comparison with the maximum charge amount.

The segment 31a and the segment 31b need not be displayed only in different colors, but may be displayed in different patterns. The pattern for the segment 31 refers to the type of the frame line constituting the segments, and a design applied to the region within the frame line. The type of the frame line is, for example, a publicly known linetype, such as a solid line, a broken line, a thick line, or a dashed dotted line. Examples of the design are solid fills, hatching, dots, and arrangement of arbitrary graphics.

As shown in FIG. 4B, moreover, as a mode of displaying the segment group so that the number of the segments 31 can be recognized, the charge amount display apparatus 10 displays the segments 31 for a value equal to or lower than the charge limit value, in the first region 21a of the first region 21a and the second region 21b divided by the mark 32. This makes it possible to recognize that the charge limit value has been set, and to easily recognize how much charge limit value has been set, in comparison with the maximum charge amount.

Embodiment 2

The charge amount display apparatus 10 according to Embodiment 1, as shown in FIGS. 3A to 3C, sets the charge limit value by selecting the number of the segments, but such an embodiment is not limitative.

Figure 5:
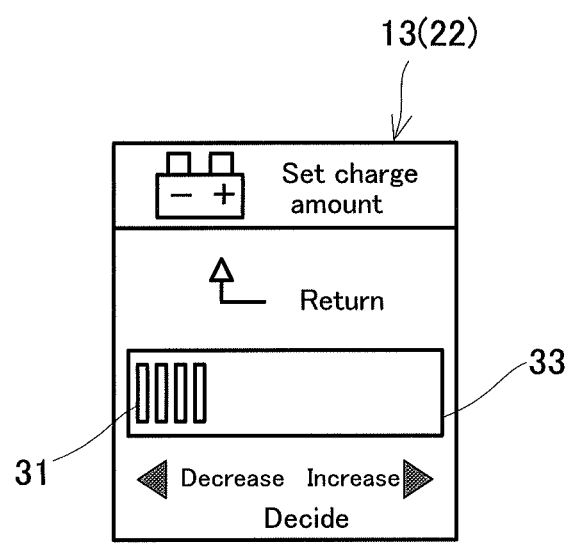
FIG. 5 is a view showing another example of the display unit in setting the charge limit value.

FIG. 5 is a view showing an example of the display unit in setting the charge limit value. The same constituents as those in Embodiment 1 are assigned the same numerals as in Embodiment 1, and duplicate explanations are omitted.

A setting screen for a charge amount is displayed in the second display region 22. A frame line 33 of such a size as to be capable of accommodating all the segments 31 is displayed in the center of the second display region 22.

Three options, described as "Decrease", "Increase", and "Decide", are displayed below the frame line 33. Any of these options can be chosen by operating the input unit 14.

When the option "Increase" is chosen by the input unit 14, the control unit 11 increases the number of the segments 31, which are to be displayed in the frame line 33, by one. Similarly, when the option "Decrease" is chosen by the input unit 14, the control unit 11 decreases the number of the segments 31, which are to be displayed in the frame line 33, by one. When the option "Decide" is chosen by the input unit 14, the control unit 11 sets a charge amount, corresponding to the number of the segments displayed in the frame line 33, as the charge limit value in the BMU 12.

According to the charge amount display apparatus in such embodiments, the driver fills a part of the entire frame line 33, which represents the maximum charge amount, with the segments 31, thereby making it possible to set the charge limit value visually. By filling about 80% of the frame line 33 with the segments 31, for example, the charge limit value can also be rendered about 80% of the maximum charge amount, so that an intuitive setting can be made.

The setting of such a visual charge limit value, in particular, is useful if each segment 31 is not a quotient obtained by equally dividing the maximum charge amount. For example, assume that charge amounts represented by 16 of the segments 31 are different from one another, as shown in Table 1.

TABLE 1

| No. | Charge amount (%) | Cumulative charge amount (%) |
|---|---|---|
| 1 | 5 | 5 |
| 2 | 5 | 10 |

TABLE 1-continued

| No. | Charge amount (%) | Cumulative charge amount (%) |
|---|---|---|
| 3 | 5 | 15 |
| 4 | 5 | 20 |
| 5 | 5 | 25 |
| 6 | 5 | 30 |
| 7 | 5 | 35 |
| 8 | 5 | 40 |
| 9 | 5 | 45 |
| 10 | 5 | 50 |
| 11 | 5 | 55 |
| 12 | 5 | 60 |
| 13 | 10 | 70 |
| 14 | 10 | 80 |
| 15 | 10 | 90 |
| 16 | 10 | 100 |

The numbers refer to numerical values assigned to the respective segments 31 sequentially from left to right. The charge amounts are the charge amounts represented by the respective segments, and the cumulative charge amounts refer to the totals of the charge amounts represented by the first to nth segments 31. The segments 31 numbered 1 to 12 each represent a charge amount of 5% of the maximum charge amount, while the segments 31 numbered 13 to 16 each represent a charge amount of 10% of the maximum charge amount.

Let it be assumed that the driver wishes to set the charge limit value at a value of the order of 60% of the maximum charge amount. If the charge limit value is directly inputted, the charge limit value "60%" is obtained via the input unit 14. In correspondence with this charge limit value, the segments 31 numbered 1 to 12 are taken from Table 1 and displayed on the display unit 13. That is, of the total 16 segments 31, 12 of the segments 31 accounting for ¾ are displayed.

Consequently, although the driver has set the charge limit value at a value of the order of 60% of the maximum charge amount, the driver incorrectly recognizes that up to 75% or so has been charged on the display unit 13.

In the present embodiment, on the other hand, if the driver tries to set the charge limit value at a value of the order of 60% of the maximum charge amount, it follows that of the total 16 segments 31, 10 of the segments occupying about 60% are set.

In this case, it is seen from Table 1 that the cumulative charge amount is about 50%, which is different from the actually intended 60%. Apparently on the display unit 13, however, 10 of the segments 31, which correspond to a value of the order of about 60% of the total 16 segments set by the driver, are displayed as the charge limit value. That is, the set charge limit value of 60% can be confirmed, as it is, on the display unit 13. By so enabling the charge limit value to be set in units of segments, the charge limit value can be displayed on the display unit 13 so as to agree with the recognition at the time of setting, without misrecognition on the part of the driver.

Also in the case of selecting one item from the plurality of "X/N" items, as in Embodiment 1, the charge limit value can be displayed on the display unit 13 so as to agree with the recognition at the time of setting, without misrecognition on the part of the driver.

As mentioned above, the input unit 14 (touch panel or the like) includes the setting screen for the charge limit value, and the segments 31 (segment group) are displayed on the setting screen. The input unit 14 is configured to input the charge limit value by the user deciding on the number of the segments to be displayed on the setting screen, in correspondence with the charge limit value.

As noted here, the input unit 14 is configured to be capable of determining the number of the segments on the setting screen displaying the segments 31. Thus, the user can determine the number of the segments corresponding to the desired charge limit value while confirming the number of the segments 31 displayed on the setting screen.

The display mode of the segments to be displayed on the setting screen is not limited to the one described in the present embodiment. As described in FIG. 4A, for example, display may be made on the setting screen so that the display mode of the segments 31 differs, in correspondence with the charge limit value. That is, whenever "Increase" or "Decrease" is chosen by the user via the input unit 14, the control unit 11 increases or decreases the charge limit value and, in correspondence with the changed charge limit value, allows the setting screen to display the segments 31a and the segments 31b, for example, in different display colors. When "Decide" is chosen by the user via the input unit 14, the control unit 11 acquires the charge limit value, corresponding to the number of the segments 31a at that time, as the input value.

Furthermore, the display mode of the segments to be displayed on the setting screen may be one in which, in accordance with the charge limit value, the mark 32 is displayed on the setting screen at a position corresponding to the charge limit value, for example, as described in FIG. 4(b). That is, whenever "Increase" or "Decrease" is chosen by the user via the input unit 14, the control unit 11 increases or decreases the charge limit value and, in correspondence with the changed charge limit value, changes the display position of the mark 32 and displays it on the setting screen. When "Decide" is chosen by the user via the input unit 14, the control unit 11 acquires the charge limit value, corresponding to the display position of the mark 32 at that time, as the input value.

Other Embodiments

In the example of FIG. 4A in Embodiment 1, the maximum charge amount and the charge limit value can be recognized by displaying the segments 31 with different colors. In the example of FIG. 4B, the segments 31 are displayed in the first region 21a, one part of the first display region 21 divided by the mark 32, whereby the maximum charge amount and the charge limit value are recognizable.

However, the displays of the maximum charge amount and the charge limit value on the display unit 13 are not limited to the above-described modes, and the display unit 13 may display the maximum charge amount and the charge limit value in different display modes. By so doing, the driver can recognize that the charge limit value equal to or less than the maximum charge amount has been set. Such display modes are exemplified by changes in the shapes of the segments representing the maximum charge amount and the charge limit value. Even such display modes make it possible to recognize the setting of the charge limit value.

Embodiments 1 and 2 are configured in a mode in which the plurality of segments 31 are arranged side by side linearly in one direction, but such a mode is not limitative. The plurality of segments 31 need not be arranged only in a linear form, but may be arranged side by side along an arcuate form or a curved line. That is, the arrangement in one direction, as described herein, means that a plurality of segments are arranged so as to follow a single line such as a straight line or a curved line.

The charge amount display apparatus 10 according to Embodiment 1 is equipped with the control unit 11 as an example of a charge amount setting means, the BMU 12 as an example of the charge control means for the battery, and the display unit 13 as an example of the display means, but is not limited to such an embodiment. That is, the respective means may be constituted as an integral apparatus.

The charge amount display apparatus according to at least one embodiment of the present invention is a charge amount display apparatus of an electric vehicle, comprising: an input unit capable of inputting a charge limit value as an upper limit of a charge amount of a battery which can be charged and can supply electric power to a motor serving as a power source for the electric vehicle; and a display unit for displaying a maximum charge amount, to which the battery can be charged, by a segment group composed of a plurality of segments arranged side by side, the segments each representing the charge amount of the battery, wherein the input unit is configured to be capable of inputting the charge limit value based on the number of the segments.

According to the first aspect, the maximum charge amount of the battery can be display on the display unit by the segment group, and the setting of the charge limit value can be made by adjusting the number of the segments. Thus, the driver can easily recognize the maximum charge amount by the segment group, and can make a charge to the battery a value equal to or lower than the charge limit value simply by setting the number of the segments displayed on the display unit while confirming this number.

A second aspect of the present invention is the charge amount display apparatus of an electric vehicle according to the first aspect, wherein the display unit displays the charge limit value by displaying the segment group so that the number of the segments inputted by the input unit can be recognized.

According to the second aspect, the charge limit value set by the driver is displayed as the number of the segments. Thus, the degree of the set charge limit value can be easily grasped.

A third aspect of the present invention is the charge amount display apparatus of an electric vehicle according to the second aspect, wherein the display unit displays the segments for a value equal to or lower than the charge limit value, and the segments for a value higher than the charge limit value, in different display modes.

According to the third aspect, the degree of the set charge limit value can be more easily grasped.

A fourth aspect of the present invention is the charge amount display apparatus of an electric vehicle according to the third aspect, wherein the display unit displays the segments for the value equal to or lower than the charge limit value, and the segments for the value higher than the charge limit value, in different colors or patterns.

According to the fourth aspect, the segments for a value equal to or lower than the charge limit value, and the segments for a value higher than the charge limit value are different in color or pattern. Thus, it can be easily recognized that the charge limit value has been set. Furthermore, the degree of the set charge limit value can be easily recognized in comparison with the maximum charge amount.

A fifth aspect of the present invention is the charge amount display apparatus of an electric vehicle according to the second aspect, wherein the display unit constructs the segment group from a first region displaying the segments for a value equal to or lower than the charge limit value, and a second region capable of displaying the segments for a value higher than the charge limit value, and displays between the first region and the second region a mark indicating that the charge limit value has been set.

According to the fifth aspect, the segments for a value equal to or lower than the charge limit value are displayed in the first region of the two regions, i.e. the first region and the second region, divided by the mark. Thus, it can be easily recognized that the charge limit value has been set. Furthermore, what degree of the charge limit value has been set can be easily recognized in comparison with the maximum charge amount.

A sixth aspect of the present invention is the charge amount display apparatus of an electric vehicle according to any one of the first to fifth aspects, wherein the charge amounts of the battery represented by the segments have been set to be different among the segments.

According to the sixth aspect, the charge limit value can be displayed on the display unit so as to agree with the recognition at the time of setting, without misrecognition by the driver.

A seventh aspect of the present invention is the charge amount display apparatus of an electric vehicle according to any one of the first to sixth aspects, wherein the input unit is configured such that the charge limit value is inputted upon selection or inputting, by a user, of a value corresponding to the number of the segments.

According to the seventh aspect, the input unit is configured such that the user selects a value corresponding to the number of the segments, whereby the charge limit value is inputted. Thus, simply by selecting one of the plurality of charge limit values, the charge limit value desired by the user can be set. Moreover, the input unit is configured to input the charge limit value when the user inputs the value corresponding to the number of the segments. Hence, the charge limit value desired by the user can be set directly and promptly.

An eighth aspect of the present invention is the charge amount display apparatus of an electric vehicle according to any one of the first to sixth aspects, wherein the input unit includes a setting screen for setting the charge limit value, the segment group is displayed on the setting screen, and the user determines the number of the segments to be displayed on the setting screen in correspondence with the charge limit value, whereby the charge limit value is inputted.

According to the eighth aspect, the user can determine the number of the segments corresponding to the desired charge limit value while confirming the number of the segments displayed on the setting screen.

INDUSTRIAL APPLICABILITY

The present invention can be utilized in industrial fields involving automobiles.

EXPLANATIONS OF LETTERS OR NUMERALS

1 Electric vehicle
10 Charge amount display apparatus
11 Control unit (charge amount setting means)
12 BMU (charge control means)
13 Display unit (display means)
14 Input unit (input means)
21 First display region
21*a* First region
21*b* Second region
22 Second display region
30 Segment group
31, 31*a*, 31*b* Segment
32 Mark

The invention claimed is:

1. A charge amount display apparatus of an electric vehicle, comprising:
   an input unit capable of inputting a charge limit value as an upper limit of a charge amount of a battery which can be charged and can supply electric power to a motor serving as a power source for the electric vehicle; and
   a display unit that displays a maximum charge amount, to which the battery can be charged, by a segment group composed of a plurality of segments arranged side by side, the segments each representing a percentage of the charge amount of the battery,
   wherein the input unit is configured to input the charge limit value based at least in part on a number of the segments.

2. The charge amount display apparatus of an electric vehicle according to claim 1, wherein
   the display unit displays the charge limit value by displaying the segment group so that the number of the segments inputted by the input unit can be recognized.

3. The charge amount display apparatus of an electric vehicle according to claim 2, wherein
   the display unit displays the segments for a value equal to or lower than the charge limit value, and the segments for a value higher than the charge limit value, in different display modes.

4. The charge amount display apparatus of an electric vehicle according to claim 3, wherein
   the display unit displays the segments for the value equal to or lower than the charge limit value, and the segments for the value higher than the charge limit value, in different colors or patterns.

5. The charge amount display apparatus of an electric vehicle according to claim 2, wherein
   the display unit
   constructs the segment group from a first region displaying the segments for a value equal to or lower than the charge limit value, and a second region capable of displaying the segments for a value higher than the charge limit value, and
   displays between the first region and the second region a mark indicating that the charge limit value has been set.

6. The charge amount display apparatus of an electric vehicle according to claim 1, wherein
   the charge amounts of the battery represented by the segments have been set to be different among the segments.

7. The charge amount display apparatus of an electric vehicle according to claim 1, wherein
   the input unit is configured such that the charge limit value is inputted upon selection or inputting, by a user, of a value corresponding to the number of the segments.

8. The charge amount display apparatus of an electric vehicle according to claim 1, wherein
   the input unit includes a setting screen for setting the charge limit value,
   the segment group is displayed on the setting screen, and
   a user determines the number of the segments to be displayed on the setting screen in correspondence with the charge limit value, whereby the charge limit value is inputted.

* * * * *